United States Patent
Lim et al.

(10) Patent No.: US 12,195,583 B2
(45) Date of Patent: Jan. 14, 2025

(54) BIODEGRADABLE RESIN COMPOSITION HAVING IMPROVED MECHANICAL PROPERTY, FORMABILITY, AND WEATHERPROOF AND METHOD FOR MANUFACTURING THE SAME

(71) Applicant: ANKOR BIOPLASTICS CO., LTD., Wonju-si (KR)

(72) Inventors: Heon Young Lim, Wonju-si (KR); Yoon Cho, Wonju-si (KR); Myung Je You, Suwon-si (KR)

(73) Assignee: ANKOR BIOPLASTICS CO., LTD., Wonju-si (KR)

( * ) Notice: Subject to any disclaimer, the term of this patent is extended or adjusted under 35 U.S.C. 154(b) by 441 days.

(21) Appl. No.: 17/596,560

(22) PCT Filed: Nov. 23, 2020

(86) PCT No.: PCT/KR2020/016623
§ 371 (c)(1),
(2) Date: Dec. 13, 2021

(87) PCT Pub. No.: WO2021/141236
PCT Pub. Date: Jul. 15, 2021

(65) Prior Publication Data
US 2022/0243005 A1  Aug. 4, 2022

(30) Foreign Application Priority Data

Jan. 9, 2020 (KR) .................. 10-2020-0003155
Mar. 18, 2020 (KR) .................. 10-2020-0033499

(51) Int. Cl.
| | | |
|---|---|---|
| C08G 63/16 | (2006.01) | |
| C08G 18/73 | (2006.01) | |
| C08G 63/672 | (2006.01) | |
| C08G 63/80 | (2006.01) | |
| C08G 63/85 | (2006.01) | |

(52) U.S. Cl.
CPC ............ *C08G 63/16* (2013.01); *C08G 18/73* (2013.01); *C08G 63/672* (2013.01); *C08G 63/80* (2013.01); *C08G 63/85* (2013.01); C08G 2230/00 (2013.01)

(58) Field of Classification Search
CPC ............ C08G 18/0895; C08G 18/4216; C08G 18/4238; C08G 18/4252; C08G 18/73; C08G 2230/00; C08G 63/16; C08G 63/181; C08G 63/60; C08G 63/672; C08G 63/80; C08G 63/85; C08G 63/916; C08L 67/025
See application file for complete search history.

(56) References Cited

U.S. PATENT DOCUMENTS

| | | | | |
|---|---|---|---|---|
| 2002/0004578 A1* | 1/2002 | Shelby | ............... | C08G 63/668 |
| | | | | 528/183 |
| 2011/0039999 A1* | 2/2011 | Witt | ............... | C08G 18/73 |
| | | | | 524/879 |
| 2015/0183927 A1* | 7/2015 | Kang | ............... | C08G 63/78 |
| | | | | 528/302 |

FOREIGN PATENT DOCUMENTS

| | | |
|---|---|---|
| CN | 1826366 | 8/2006 |
| CN | 101215371 | 7/2008 |
| CN | 106916286 | 7/2017 |
| JP | 2005-002331 A | 1/2005 |
| JP | 2010-007087 | 1/2010 |
| JP | 4635475 | 2/2011 |
| KR | 10-1690082 | 1/2017 |
| KR | 10-1690082 B1 | 1/2017 |
| KR | 10-2017-0077905 A | 7/2017 |
| KR | 10-1784221 B1 | 10/2017 |
| KR | 101784221 | * 10/2017 |
| KR | 101989045 | * 12/2017 |
| KR | 10-1989045 B1 | 6/2019 |
| WO | 2004-104067 | 12/2004 |

OTHER PUBLICATIONS

Written Opinion of the International Searching Authority for PCT/KR2020/016623 (Year: 2021).*
International Search Report and Written Opinion for International Application No. PCT/KR2020/016623, Feb. 26, 2021, ISA/KR.

* cited by examiner

*Primary Examiner* — Frances Tischler
*Assistant Examiner* — Gennadiy Mesh
(74) *Attorney, Agent, or Firm* — LEX IP MEISTER, PLLC

(57) ABSTRACT

A biodegradable resin composition is obtained by subjecting an aliphatic dicarboxylic acid or an acid component comprising a mixture of an aliphatic dicarboxylic acid and an aromatic dicarboxylic acid, and an aliphatic diol sequentially to esterification, transesterification, polycondensation, chain extension and solid-state polymerization reactions in the presence of a polyfunctional compound represented by the following Formula 1:

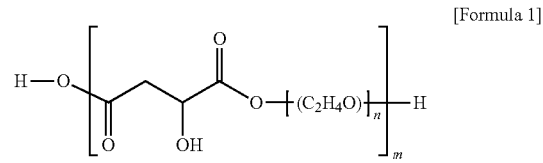

[Formula 1]

wherein n is an integer ranging from 1 to 11, and m is an integer ranging from 2 to 30.

17 Claims, No Drawings

BIODEGRADABLE RESIN COMPOSITION HAVING IMPROVED MECHANICAL PROPERTY, FORMABILITY, AND WEATHERPROOF AND METHOD FOR MANUFACTURING THE SAME

CROSS-REFERENCE TO RELATED APPLICATION

This application is a 371 U.S. national stage of PCT/KR2020/016623, filed Nov. 23, 2020 which claims the benefit of Korean Patent Application No. 10-2020-0003155, filed Jan. 9, 2020 and Korean Patent Application No. 10-2020-0033499, filed Mar. 18, 2020, the contents of each of which are incorporated herein by reference.

TECHNICAL FIELD

The present invention relates to a biodegradable resin composition having improved mechanical properties, formability and weatherproof, and a method for manufacturing the biodegradable resin composition, which is obtained by mixing an aliphatic dicarboxylic acid or an acid component comprising a mixture of an aliphatic dicarboxylic acid and an aromatic dicarboxylic acid, and aliphatic diol, and subjecting the e mixture sequentially to esterification, transesterification, polycondensation, chain extension and solid-state polymerization reactions in the presence of a polyfunctional compound.

BACKGROUND ART

The social problem of environmental pollution is emerging all over the world. Various plastics used in the industrial field are made of hard-to-decompose materials that are difficult to decompose by nature, and these plastics are often disposed of by landfilling and incineration after use. In this case, there is a problem of causing environmental pollution due to the lack of harmful landfill sites and substances generated during incineration. As one of solutions to this problem, the research of biodegradable resins for disposable products has been actively carried out.

There are several types of biodegradable resins known so far, but each has different biodegradability, molecular weight, and various physical properties. Therefore, when applying the biodegradable resin to a product, there is a limitation in its limited due to poor moldability or use, or its use is productability.

Aliphatic polyester resins are known as biodegradable resins and are easily thermally decomposed due to low thermal stability during melting, so the range of working conditions that can be molded is narrow, and the product defect rate is high. In addition, there is a problem in that the use is limited because mechanical properties such as tensile strength and tear strength are inferior. As one method for solving these problems, Korean Patent Application No. 1993-0020638 discloses a method for synthesizing a high molecular weight aliphatic polyester resin having a number-average molecular weight of 30,000 or more by appropriately adjusting the reaction temperature, vacuum degree and catalyst conditions. However, the aliphatic polyester resin prepared by this method has a low weight-average molecular weight, is very sensitive to heat, and has poor moldability.

As another example, Korean Patent Application No. 1997-0004788 discloses a method for producing a high molecular weight aliphatic polyester by using a polyhydric alcohol of trihydric or higher or a monomer of trihydric or higher polyhydric carboxylic acid as a reaction accelerator to shorten reaction time and increase molecular weight distribution. However, it is difficult to control the reaction due to the high reactivity of the polyfunctional compound, and there is a high risk of gelation.

In addition, Korean Patent Application No. 2011-0054172 discloses a method for producing a high molecular weight aliphatic polyester by using a mixture of an oxazoline compound and a carbodiimide as an unsaturated compound. However, in this method, because the functional groups participating in the reaction exist together in the reactor, a competitive reaction occurs, making it difficult to control the reaction and the possibility of gelation is high, and the color defect of the obtained resin is easy to occur.

On the other hand, the aliphatic/aromatic copolyester resin is known as a resin having biodegradability including aliphatic dicarboxylic acid and aromatic dicarboxylic acid. However, the aliphatic/aromatic copolyester resin has a problem in that it is difficult to mold it into a general plastic product because it has adhesiveness depending on the components.

In order to solve this problem, attempts to obtain a high molecular weight resin composition are continuously being made. Korean Patent Publication No. 1993-0701622 discloses a method for preparing an aliphatic/aromatic copolyester resin by mixing an aliphatic diol component single component. However, the aliphatic/aromatic copolyester resin prepared by the above method has disadvantages in that mechanical properties and processability are lowered compared to conventional general-purpose resins such as polyethylene and polypropylene.

In addition, Korea Patent Publication No. 1997-2703252 discloses a method for preparing an aliphatic/aromatic copolyester resin by mixing a sulfonate compound or a compound having three or more ester-forming functional groups. However, the above method can shorten the reaction time and increase the weight-average molecular weight of the aliphatic/aromatic copolyester resin, but the molecular weight distribution is relatively wide, so that a large amount of low molecular weight copolyester is present. When the low molecular weight copolyester is present, thermal decomposition is easily induced during the processing process, and there is a problem in that the durability of the manufactured product is deteriorated because it is vulnerable to moisture in the atmosphere.

In addition, Korean Patent Publication No. 1997-7007208 discloses a method for preparing an aliphatic/aromatic copolyester resin using a dihydroxy compound containing an ether functional group. However, due to the long chain of the polyol, the esterification reaction and the polycondensation reaction are not smoothly performed, so it is difficult to obtain a high molecular weight aliphatic/aromatic copolyester resin, and the reaction time is long, which is disadvantageous in terms of production cost.

Therefore, there is an urgent need for research and development for a new resin composition having a high degree of biodegradability while supplementing the low moldability and mechanical properties of conventional biodegradable resin.

PRIOR ART DOCUMENTS (Patent Document 1) Korean Patent Application No. 1993-0020638
(Patent Document 2) Korean Patent Application No. 1997-0004788

(Patent Document 3) Korean Patent Application No. 2011-0054172
(Patent Document 4) Korean Patent Publication No. 1993-0701622
(Patent Document 5) Korean Patent Publication No. 1997-2703252
(Patent Document 6) Korean Patent Publication No. 1997-7007208

DISCLOSURE

Technical Problem

The present invention has made in order to solve the above problem, and an object of the present invention is to provide a biodegradable resin composition having improved mechanical properties, formability, and weatherproof.

Another object of the present invention is to provide a method for preparing a biodegradable resin composition having an improved reaction rate while reducing the risk of gelation.

The object of the present invention is not limited to the object mentioned above. The objects of the present invention will become more apparent from the following description and will be realized by means and combinations thereof described in the claims.

Technical Solutions

In one aspect, the present invention provides a biodegradable resin composition which may be obtained by subjecting an aliphatic dicarboxylic acid or an acid component comprising a mixture of an aliphatic dicarboxylic acid and an aromatic dicarboxylic acid, and aliphatic diol sequentially to esterification, transesterification, polycondensation, chain extension and solid-state polymerization reactions in the presence of a polyfunctional compound having a long chain used as a reaction accelerator.

The biodegradable resin composition according to the present invention sequentially reacts reactants with an esterification reaction, a transesterification reaction, a polycondensation reaction, a chain extension reaction, and a solid-state polymerization reaction in the presence of a polyfunctional compound having a long chain used as a reaction accelerator. By doing this, the reaction rate is improved, resulting in excellent productivity and economic efficiency, and by reducing the high-temperature polycondensation time compared to the prior art, it is possible to prevent the increase in terminal carboxyl groups of the biodegradable resin occurring during manufacture. In addition, chain extension reaction and solid-state polymerization reaction are essentially performed after polycondensation reaction, and finally, high processability, durability and physical properties are excellent compared to conventional aliphatic biodegradable polyester resins and biodegradable aliphatic/aromatic biodegradable copolyester resins. In addition to being able to obtain a biodegradable resin composition having a molecular weight, it is finally decomposed into water and carbon dioxide by microorganisms in a natural environment, which is environmentally friendly.

In the biodegradable resin composition of the present invention, the biodegradable resin composition obtained by mixing and sequentially reacting an aliphatic dicarboxylic acid and an aliphatic diol may be referred to as a biodegradable aliphatic polyester resin for convenience. In addition, the biodegradable resin composition obtained by mixing and sequentially reacting an acid component containing a mixed component of an aliphatic dicarboxylic acid and an aromatic dicarboxylic acid with an aliphatic diol may be referred to as a biodegradable aliphatic/aromatic polyester resin for convenience.

Specifically, a biodegradable resin composition of the present invention may be obtained by subjecting an aliphatic dicarboxylic acid or an acid component comprising a mixture of an aliphatic dicarboxylic acid and an aromatic dicarboxylic acid, and aliphatic diol sequentially to esterification, transesterification, polycondensation, chain extension and solid-state polymerization reactions in the presence of a polyfunctional compound represented by the following Formula 1.

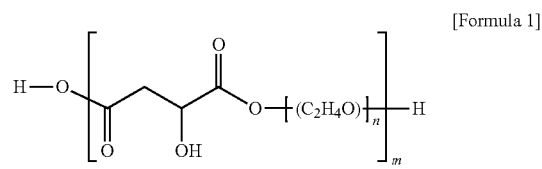

[Formula 1]

Wherein n is an integer ranging from 1 to 11, and m is an integer ranging from 2 to 30.

The polyfunctional compound may be a reaction accelerator which is added to the esterification reaction during the production of the biodegradable resin composition. The polyfunctional compound acts as a reaction accelerator in the esterification process for synthesis of the biodegradable resin, so that the biodegradable resin composition having a desired number-average molecular weight and weight-average molecular weight more suitable compared to conventional aliphatic polyester resins and aliphatic/aromatic copolyester resins may be easily and quickly obtained. This increase in the reaction rate has an economic advantage due to high productivity.

In addition, since the high-temperature polycondensation reaction time is shortened due to the use of the polyfunctional compound, the biodegradable aliphatic polyester resin and the biodegradable aliphatic/aromatic polyester resin according to the present invention has a lower concentration of end carboxyl groups than a conventional biodegradable aliphatic polyester resin and biodegradable aliphatic/aromatic polyester resin, and thus advantageously has excellent durability. In addition, since the polyfunctional compound has steric hindrance in the molecular structure and functional groups at different positions, and thus has different reaction activities. Thus, the polyfunctional compound has advantages in that it is easily handled and the reaction thereof is easily controlled. That is, as the polyfunctional compound is used as a reaction accelerator, it is possible to increase the reaction rate and solve the problems that it is difficult to control the reaction of polyfunctional compounds such as citric acid and glycerol, which are used as conventional reaction promoters, and gelling of these compounds easily occurs. In addition, since citric acid and glycerol that are used as conventional reaction accelerators have high reactivity that is difficult to control, they easily combine with the reactive sites of the reactants, so that the active reactive sites of the product after the polycondensation reaction are small. However, the polyfunctional compound of the present invention has a relatively high concentration of residual active reactive sites, and thus the efficiency of the chain extension and solid-state polymerization reactions that are sequentially performed after the polycondensation reaction is high, making it possible to obtain an aliphatic polyester having a desired molecular weight.

In addition, the polyfunctional compound may form side chains in the main chain of the molecular structure of the biodegradable resin, thus not only improving the tear strength of the biodegradable resin, but also imparting excellent processability to the biodegradable resin composition, that is, the biodegradable aliphatic polyester resin composition and the biodegradable aliphatic/aromatic polyester resin composition, by widening the molecular weight distribution of the biodegradable resin.

The polyfunctional compound may be obtained by mixing DL-malic acid and ethylene glycol or a polyethylene glycol having a weight-average molecular weight (Mw) of 150 to 500 g/mol at a molar ratio of 1:1 to 1:1.5, preferably 1:1.1 to 1:1.4, more preferably 1:1.15 to 1:1.3, most preferably 1:1.2, and subjecting the mixture to an esterification reaction. At this time, when the molar ratio between DL-malic acid and ethylene glycol or polyethylene glycol is out of the above range, the polyfunctional compound represented by Formula 1 may not be properly synthesized.

The polyfunctional compound may be produced according to the following Reaction Scheme 1. Preferably, the polyfunctional compound may be obtained by mixing DL-malic acid and ethylene glycol and subjecting the mixture to an esterification reaction.

pimelic acid, suberic acid, azelic acid, sebacic acid, 1,4-cyclohexyldicarboxylic acid, and esterified derivatives thereof. Preferably, the aliphatic dicarboxylic acid may be at least one selected from the group consisting of succinic acid, adipic acid, and sebacic acid.

In a specific example, the aromatic dicarboxylic acid may be at least one selected from the group consisting of terephthalic acid, isophthalic acid, 2,6-naphthoic acid, and esterified derivatives thereof. Preferably, the aromatic dicarboxylic acid may be terephthalic acid, isophthalic acid, or an esterified derivative thereof, and more preferably terephthalic acid or dimethyl terephthalate, which is an esterified derivative thereof.

The acid component is a mixed component of the aliphatic dicarboxylic acid and the aromatic dicarboxylic acid. The mixed component of the aliphatic dicarboxylic acid and the aromatic dicarboxylic acid contains the aliphatic dicarboxylic acid and the aromatic dicarboxylic acid in a molar ratio of 95:5 to 40:60, preferably 80:20 to 42:58, more Preferably 60:40 to 45:55, and most preferably 48:52 to 45:55. At this time, if the content of the aromatic dicarboxylic acid is less than 5 moles, the effect of improving mechanical properties including elongation and tear strength cannot be expected, and if it exceeds 60 moles, the biodegradability effect may be lost.

[Reaction Scheme 1]

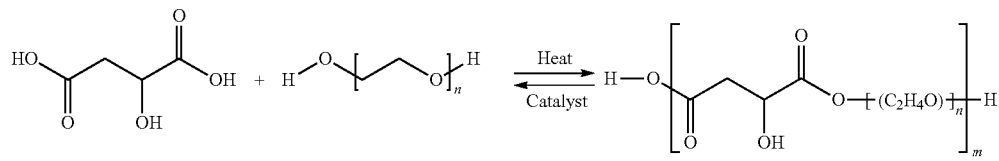

wherein n is an integer ranging from 1 to 11, and m is an integer ranging from 2 to 30.

The polyfunctional compound may be mixed in an amount of 0.1 to 3 g, preferably 0.8 to 2.5 g, more preferably 1 to 2 g, most preferably 1 to 1.5 g, per mole of the aliphatic dicarboxylic acid or the acid component comprising the mixture of the aliphatic dicarboxylic acid and the aromatic dicarboxylic acid. At this time, if the mixing amount of the polyfunctional compound is less than 0.1 g per mol of the aliphatic dicarboxylic acid or the acid component comprising the mixture of the aliphatic dicarboxylic acid and the aromatic dicarboxylic acid, the esterification reaction of the aliphatic dicarboxylic acid and the fatty acid diol or the esterification reaction of the acid component and the fatty acid diol will not sufficiently occur, and the reaction rate may be slow. On the other hand, if the mixing amount of the polyfunctional compound is 3 g, the overall reaction rate may increase, but the polyfunctional compound may cause gelling of the obtained resin, thus causing a gel or a fish eye in a product produced using the resin, or in severe cases, making it impossible to discharge the resin from the reactor.

The aliphatic dicarboxylic acid may be a compound represented by the following Formula 2.

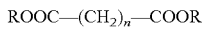 [Formula 2]

wherein n is an integer ranging from 0 to 10, and R is hydrogen or a methyl group.

In a specific example, the aliphatic dicarboxylic acid may be at least one selected from the group consisting of oxalic acid, malonic acid, succinic acid, glutaric acid, adipic acid, The aliphatic diol may be a $C_2$ to $C_{12}$ linear aliphatic diol, a $C_5$ to $C_{15}$ cycloaliphatic diol, or a mixture thereof. Preferably, the aliphatic diol may be at least one selected from the group consisting of ethylene glycol, 1,2-propanediol, 1.2-butanediol, 1,3-butanediol, 1,4-butanediol, 1,6-hexanediol and 1,2-cyclohexanedimethanol, 1,4-cyclohexanedimethanol. More preferably, the aliphatic diol may be at least one selected from the group consisting of 1,4-butanediol, ethylene glycol, or a mixture thereof.

The aliphatic dicarboxylic acid and the aliphatic diol or the acid component and the aliphatic diol may be mixed together at a molar ratio of 1:1.1 to 1.5, preferably 1:1.15 to 1.4, more preferably 1:1.15 to 1.3, most preferably 1:1.2 to 1.25. At this time, if the molar ratio between the aliphatic dicarboxylic acid and the aliphatic diol or the acid component and the aliphatic diol is less than 1:1.1, the esterification reaction or the transesterification reaction may not be smoothly performed, and thus the color of the obtained resin composition may be adversely affected and it is difficult to obtain the resin having a high molecular weight. On the other hand, if the molar ratio is greater than 1:1.5, the production cost may increase due to a decrease in the degree of vacuum in the reaction process, thus lowering economic efficiency.

The biodegradable aliphatic polyester resin may have a melting point of 65 to 120° C., a number-average molecular weight (Mn) of 35,000 to 80,000, a weight-average molecular weight (Mw) of 100,000 to 350,000, a melt flow index of 0.5 to 10 g/10 min as measured at 190° C. and a load of 2.16 kg. Preferably, the biodegradable aliphatic polyester resin may have a melting point of 85 to 118° C., a number-average molecular weight (Mn) of 38,000 to 60,000, a weight-average molecular weight (Mw) of 110,000 to 250,000, and a melt flow index of 1 to 8 g/10 min as measured at 190° C. and a load of 2.16 kg. More preferably, the biodegradable aliphatic polyester resin may have a melting point of 95 to 115° C., a number-average molecular weight (Mn) of 40,000 to 65,000, a weight-average molecular weight (Mw) of 115,000 to 200,000, and a melt flow index of 2 to 6 g/10 min as measured at 190° C. and a load of 2.16 kg.

The biodegradable aliphatic/aromatic copolyester resin may have a melting point of 85 to 160° C., a number-average molecular weight (Mn) of 35,000 to 80,000, a weight-average molecular weight (Mw) of 100,000 to 350,000, a melt flow index of 0.5 to 10 g/10 min as measured at 190° C. and a load of 2.16 kg. Preferably, the biodegradable aliphatic/aromatic copolyester resin may have a melting point of 95 to 150° C., a number-average molecular weight (Mn) of 38,000 to 60,000, a weight-average molecular weight (Mw) of 110,000 to 250,000, and a melt flow index of 1 to 8 g/10 min as measured at 190° C. and a load of 2.16 kg. More preferably, the biodegradable aliphatic/aromatic copolyester resin may have a melting point of 120 to 150° C., a number-average molecular weight (Mn) of 40,000 to 65,000, a weight-average molecular weight (Mw) of 115,000 to 200,000, a melt flow index of 2 to 6 g/10 min as measured at 190° C. and a load of 2.16 kg, and an acid value of 0.8 mg KOH/g to 2.0 mg KOH/g.

In another aspect, the present invention provides a method for manufacturing the biodegradable resin composition.

In one embodiment, the method for manufacturing the biodegradable aliphatic polyester resin composition according to the present invention comprises steps of:
(a) producing a polyfunctional compound represented by the following Formula 1 by an esterification reaction of DL-malic acid and ethylene glycol or a polyethylene glycol having a weight-average molecular weight (Mw) of 150 to 500 g/mol:

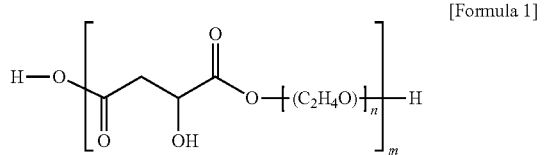

[Formula 1]

wherein n is an integer ranging from 1 to 11, and m is an integer ranging from 2 to 30;
(b) producing a reaction product by esterification and transesterification reactions of an aliphatic dicarboxylic acid and an aliphatic diol in the presence of the polyfunctional compound of step (a);
(c) producing an aliphatic polyester resin composition by a polycondensation reaction of the reaction product produced in step (b);
(d) introducing the resin composition, produced in step (c), into a twin screw extruder or a kneader, and then introducing one chain extender compound selected from among an isocyanate compound and a carbodiimide compound, followed by a chain extension reaction; and
(e) producing a biodegradable resin composition by solid-state polymerization of the resin composition, produced in step (d), at a temperature of 55° C. to 100° C. lower than the melting point of the resin composition.

In a more specific embodiment, the method for manufacturing the biodegradable aliphatic polyester resin composition according to the present invention comprises steps of:
(a) producing the polyfunctional compound represented by Formula 1 by an esterification reaction of DL-malic acid and ethylene glycol or a polyethylene glycol having a weight-average molecular weight (Mw) of 150 to 500 g/mol at a molar ratio of 1:1 to 1:1.5 in the presence of a catalyst at 180 to 210° C. for 60 to 180 minutes;
(b) mixing an aliphatic dicarboxylic acid and an aliphatic diol at a molar ratio of 1:1.1 to 1:1.5 and producing a reaction product by esterification and transesterification reactions of the mixture in the presence of the polyfunctional compound of step (a) at 185 to 235° C.;
(c) producing an aliphatic polyester resin composition by a polycondensation reaction of the reaction product, produced in (b), at 235 to 255° C. at a vacuum level of 0.1 to 2 Torr for 100 to 240 minutes;
(d) introducing the resin composition, produced in step (c), into a twin screw extruder or a kneader, and then introducing 0.05 to 1 part by weight of one chain extender compound selected from among an isocyanate compound and a carbodiimide compound, followed by a chain extension reaction at 100 to 180° C.; and
(e) producing a biodegradable resin composition by solid-state polymerization of the resin composition, produced in step (d), at a temperature of 55° C. to 100° C., which is lower than the melting point of the resin composition.

In another embodiment, the method for manufacturing the biodegradable aliphatic/aromatic copolyester resin composition according to the present invention comprises steps of:
(a) producing a polyfunctional compound represented by the above Formula 1 by an esterification reaction of DL-malic acid and ethylene glycol or a polyethylene glycol having a weight-average molecular weight (Mw) of 150 to 500 g/mol:
(b) producing a reaction product by esterification and transesterification reactions of an acid component comprising an aliphatic dicarboxylic acid and aromatic dicarboxylic acid, and an aliphatic diol in the presence of the polyfunctional compound of step (a);
(c) producing an aliphatic/aromatic copolyester resin composition by a polycondensation reaction of the reaction product produced in step (b);
(d) introducing the resin composition, produced in step (c), into a twin screw extruder or a kneader, and then introducing one chain extender compound selected from among an isocyanate compound and a carbodiimide compound, followed by a chain extension reaction; and
(e) producing a biodegradable resin composition by solid-state polymerization of the resin composition, produced in step (d), at a temperature of 70° C. to 100° C. lower than the melting point of the resin composition.

In a more specific embodiment, the method for manufacturing the biodegradable aliphatic/aromatic polyester resin composition according to the present invention comprises steps of:
(a) producing the polyfunctional compound represented by Formula 1 by an esterification reaction of DL-malic acid and ethylene glycol or a polyethylene glycol having a weight-average molecular weight (Mw) of 150 to 500 g/mol at a molar ratio of 1:1 to 1:1.5 in the presence of a catalyst at 180 to 210° C. for 60 to 180 minutes;

(b) mixing an acid component comprising an aliphatic dicarboxylic acid and an aromatic dicarboxylic acid and an aliphatic diol at a molar ratio of 1:1.1 to 1:1.5, and producing a reaction product by esterification and transesterification reactions of the mixture in the presence of the polyfunctional compound of step (a) at 185 to 235° C.;

(c) producing an aliphatic/aromatic copolyester resin composition by a polycondensation reaction of the reaction product, produced in (b), at 235 to 255° C. at a vacuum level of 0.1 to 2 Torr for 100 to 240 minutes;

(d) introducing the resin composition, produced in step (c), into a twin screw extruder or a kneader, and then introducing 0.05 to 1 part by weight of one chain extender compound selected from among an isocyanate compound and a carbodiimide compound, followed by a chain extension reaction at 100 to 180° C.; and (e) producing a biodegradable resin composition by solid-state polymerization of the resin composition, produced in step (d), at a temperature of 70° C. to 100° C., which is lower than the melting point of the resin composition.

Hereinafter, each step of the method for manufacturing the above biodegradable resin composition will be described in detail.

Step (a)

Specifically, step (a) is a step of producing the polyfunctional compound represented by Formula 1 by an esterification reaction of DL-malic acid and ethylene glycol or a polyethylene glycol having a weight-average molecular weight (Mw) of 150 to 500 g/mol:

Preferably, step (a) is a step of producing the polyfunctional compound represented by Formula 1 by an esterification reaction of DL-malic acid and ethylene glycol or a polyethylene glycol having a weight-average molecular weight (Mw) of 150 to 500 g/mol at a molar ratio of 1:1 to 1:1.5 in the presence of a catalyst at 180 to 210° C. for 60 to 180 minutes.

For the esterification reaction in step (a), DL-malic acid and ethylene glycol or a polyethylene glycol having a weight-average molecular weight (Mw) of 150 to 500 g/mol may be introduced into a reactor equipped with a reflux column, and then may be subjected to an esterification reaction with stirring at a slowly increasing temperature. At this time, the final increased temperature and the reaction in the esterification reaction may be 180 to 210° C. and 60 to 180 minutes, preferably 185 to 205° C. and 90 to 150 minutes, more preferably 190 to 200° C. and 100 to 150 minutes, most preferably 200° C. and 110 to 130 minutes. If the final increased temperature is lower than 180° C. or the reaction time is shorter than 60 minutes, the esterification reaction may not proceed smoothly. On the other hand, if the final increased temperature is higher than 210° C. or the reaction time is longer than 180 minutes, ethylene glycol boils and evaporates, and hence the molar ratio in the reaction mixture may be out of the desired range, and a good-quality polyfunctional compound may not be obtained due to thermal decomposition of the obtained product.

The catalyst that is used in step (a) may be at least one selected from the group consisting of monobutyltin oxide, titanium propoxide, and tetrabutyl titanate, but is not limited thereto. After the catalyst is introduced in an amount of 0.01 to 0.2 g, more preferably 0.01 to 0.05 g, per mole of DL-malic acid, the polyfunctional compound may be obtained by completely removing a theoretical amount of water while maintaining the temperature of the reactor at 180 to 210° C.

Step (b)

Step (b)) is a step of producing a reaction product by esterification and transesterification reactions of (1) an aliphatic dicarboxylic acid and an aliphatic diol or (2) an acid component comprising an aliphatic dicarboxylic acid and an aromatic dicarboxylic acid and an aliphatic diol in the presence of the polyfunctional compound of step (a).

Preferably, step (b) is a step of mixing (1) an aliphatic dicarboxylic acid and an aliphatic diol or (2) an acid component comprising an aliphatic dicarboxylic acid and an aromatic dicarboxylic acid and an aliphatic diol at a molar ratio of 1:1.1 to 1:1.5 and producing a reaction product by esterification and transesterification reactions of the mixture in the presence of the polyfunctional compound of step (a) at 185 to 235° C. This step is preferably performed at a temperature of 185 to 235° C., more preferably 190 to 200° C., most preferably 195° C. If the temperature is lower than 185° C., the esterification reaction and the transesterification reaction may not sufficiently occur, and on the other hand, if the temperature is higher than 235° C., the resulting product may be thermally decomposed In step (b), the aliphatic dicarboxylic acid may be a compound represented by the following Formula 2.

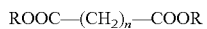

ROOC—(CH$_2$)$_n$—COOR           [Formula 2]

wherein n is an integer ranging from 0 to 10, and R is hydrogen or a methyl group.

In a specific example, the aliphatic dicarboxylic acid may be at least one selected from the group consisting of oxalic acid, malonic acid, succinic acid, glutaric acid, adipic acid, pimelic acid, suberic acid, azelic acid, sebacic acid, 1,4-cyclohexyldicarboxylic acid, and esterified derivatives thereof. Preferably, the aliphatic dicarboxylic acid may be at least one selected from the group consisting of succinic acid, adipic acid, and sebacic acid.

In a specific example, the aromatic dicarboxylic acid in step (b) may be at least one selected from the group consisting of terephthalic acid, isophthalic acid, 2,6-naphthoic acid, and esterified derivatives thereof. Preferably, the aromatic dicarboxylic acid may be terephthalic acid, isophthalic acid, or an esterified derivative thereof, and more preferably terephthalic acid or dimethyl terephthalate, which is an esterified derivative thereof.

The acid component in step (b) is a mixed component of the aliphatic dicarboxylic acid and the aromatic dicarboxylic acid. The mixed component of the aliphatic dicarboxylic acid and the aromatic dicarboxylic acid contains the aliphatic dicarboxylic acid and the aromatic dicarboxylic acid in a molar ratio of 95:5 to 40:60, preferably 80:20 to 42:58, more Preferably 60:40 to 45:55, and most preferably 48:52 to 45:55. At this time, if the content of the aromatic dicarboxylic acid is less than 5 moles, the effect of improving mechanical properties including elongation and tear strength cannot be expected, and if it exceeds 60 moles, the biodegradability effect may be lost.

The aliphatic diol in step (b) may be a $C_2$ to $C_{12}$ linear aliphatic diol, a $C_5$ to $C_{15}$ cycloaliphatic diol, or a mixture thereof. Preferably, the aliphatic diol may be at least one selected from the group consisting of ethylene glycol, 1,2-propanediol, 1.2-butanediol, 1,3-butanediol, 1,4-butanediol, 1,6-hexanediol and 1,2-cyclohexanedimethanol, 1,4-cyclohexanedimethanol. More preferably, the aliphatic diol may be at least one selected from the group consisting of 1,4-butanediol, ethylene glycol, or a mixture thereof.

The aliphatic dicarboxylic acid and the aliphatic diol or the acid component and the aliphatic diol may be mixed together at a molar ratio of 1:1.1 to 1.5, preferably 1:1.15 to 1.4, more preferably 1:1.15 to 1.3, most preferably 1:1.2 to 1.25. At this time, if the molar ratio between the aliphatic dicarboxylic acid and the aliphatic diol or the acid component and the aliphatic diol is less than 1:1.1, the esterification reaction or the transesterification reaction may not be smoothly performed, and thus the color of the obtained resin composition may be adversely affected and it is difficult to obtain the resin having a high molecular weight. On the other hand, if the molar ratio is greater than 1:1.5, the production cost may increase due to a decrease in the degree of vacuum in the reaction process, thus lowering economic efficiency.

In the esterification reaction and transesterification reaction of the acid component with the aliphatic diol in step (b), the mixed component of the aliphatic dicarboxylic acid and the aromatic dicarboxylic acid as an acid component may generate different by-products in the reaction with the aliphatic diol. In this case, it is possible to proceed with the reaction by dividing the two reactions into stages. For example, when succinic acid is used as the aliphatic dicarboxylic acid and dimethyl terephthalate is used as the aromatic dicarboxylic acid, the succinic acid reacts with the aliphatic glycol to leak water as a by-product of the reaction, and dimethyl terephthalate reacts with the aliphatic glycol to generate methanol as a by-product of the reaction. In this case, when the two components are reacted together with an acid component, the reactor column may be clogged due to competition between the two reactions.

Accordingly, in the case of using the mixed component of the aliphatic dicarboxylic acid and the aromatic dicarboxylic acid in step (b), it may be added in divided amounts in the range of use of the total amount or may be added at once in one selected reaction step. Preferably, step (b) is performed by dividing the reaction into two steps. For example, after adding succinic acid and an aliphatic diol, a theoretical amount of water is discharged. Then dimethyl terephthalate added is in the presence of an esterification product of succinic acid and an aliphatic diol to proceed with the esterification reaction, and the theoretical amount of methanol is discharged. Thereby, the reaction can be completed, or the reaction can be carried out in the reverse order. At this time, the total amount of the aliphatic diol used in the reaction may be added in the first step. Alternatively, the aliphatic diol to be added may be divided and added according to the molar ratio in each step.

Step (b) may further include a catalyst at the initial stage or late stage of the esterification reaction and the transesterification reaction. The catalyst may be at least one selected from the group consisting of titanium isopropoxide, calcium acetate, antimony trioxide, dibutyltin oxide, antimony acetate, tetrabutyl titanate, and tetrapropyl titanate, but is not limited thereto.

The catalyst may be mixed in an amount of 0.01 to 0.5 g, more preferably 0.03 to 0.2 g, most preferably 0.1 g, per mole of the aliphatic dicarboxylic acid or the acid component. If the content of the catalyst is less than 0.01 g, the esterification reaction and the transesterification reaction may be delayed or may not occur sufficiently. On the other hand, if the content of the catalyst is more than 0.5 g, side reactions may occur or the reverse reaction rate may increase, thus causing color change of the reactants and deterioration in physical properties of the reactants.

Step (b) may further include a stabilizer at the initial stage or late stage of the esterification reaction and the transesterification reaction. The stabilizer may include at least one selected from the group consisting of trimethyl phosphate, phosphoric acid and triphenyl phosphate, but is not limited thereto.

The stabilizer may be mixed in an amount of 0.01 to 0.5 g, more preferably 0.03 to 0.2 g, most preferably 0.1 g, per mole of the aliphatic dicarboxylic acid or the acid component. If the content of the stabilizer is less than 0.01 g, the esterification reaction and the transesterification reaction may not occur sufficiently, and on the other hand, if the content of the stabilizer is more than 0.5 g, the stabilizer may interfere with the progress of the reactions, thus slowing the reaction rate, and a biodegradable resin composition having a sufficiently high molecular weight cannot be obtained.

Step (C)

Step (c) is a step of producing an aliphatic polyester resin composition or an aliphatic/aromatic copolyester resin composition by a polycondensation reaction of the reaction product produced in step (b).

Preferably, in case of producing an aliphatic polyester resin composition, step (c) is a step of producing an aliphatic polyester resin composition by a polycondensation reaction of the reaction product, produced in (b), at 235 to 255° C. at a vacuum level of 0.1 to 2 Torr for 100 to 240 minutes. In this step, the polycondensation temperature and pressure may be 235 to 255° C. and 2 Torr or less, preferably 240 to 245° C. and 0.1 to 2 Torr, most preferably 245° C. and 1 to 1.5 Torr. If both the polycondensation temperature and vacuum conditions are not satisfied, the polycondensation reaction may not be performed properly, or the resulting product may be decomposed by oxidation at high temperature, and hence the color of the biodegradable resin composition, particularly the biodegradable aliphatic resin composition, may be poor or a resin having a desired molecular weight can be obtained.

Preferably, in case of producing an aliphatic/aromatic copolyester resin composition, step (c) is a step of producing an aliphatic/aromatic copolyester resin composition by a polycondensation reaction of the reaction product, produced in (b), at 235 to 255° C. at a vacuum level of 0.1 to 2 Torr for 100 to 240 minutes. In this step, the polycondensation temperature and pressure may be 235 to 255° C. and 2 Torr or less, preferably 240 to 245° C. and 0.1 to 2 Torr, most preferably 245° C. and 1 to 1.5 Torr. If both the polycondensation temperature and vacuum conditions are not satisfied, the polycondensation reaction may not be performed properly, or the resulting product may be decomposed by oxidation at high temperature, and hence the color of the biodegradable resin composition, particularly the biodegradable aliphatic/aromatic copolyester resin composition, may be poor or a resin having a desired molecular weight can be obtained.

The biodegradable aliphatic polyester resin composition obtained through a step of producing an aliphatic polyester resin composition in step (c) has a number-average molecular weight (Mn) of 12,000 to 30,000, and a melt flow index of 30 g/10 min to 65 g/10 min as measured at 190° C. and a load of 2,160 g.

The biodegradable aliphatic/aromatic copolyester resin composition obtained through a step of producing an aliphatic/aromatic copolyester resin composition in step (c) has a number-average molecular weight (Mn) of 12,000 to 30,000, a melt flow index of 30 g/10 min to 65 g/10 min as measured at 190° C. and a load of 2,160 g, and a acid value of 0.5 mg KOH/g to 1.5 mg KOH/g.

Step (d)

Step (d) is a step of introducing the resin composition (the aliphatic polyester resin composition and the aliphatic/aromatic copolyester resin composition), produced in step (c), into a twin screw extruder or a kneader, and then introducing one chain extender compound selected from among an isocyanate compound, a carbodiimide compound and a modified styrene acrylic copolymer, followed by a chain extension reaction.

Preferably, step (d) is a step of introducing the resin composition, produced in step (c), into a twin screw extruder or a kneader, and then introducing 0.05 to 1 part by weight of one chain extender compound selected from among an isocyanate compound, a carbodiimide compound and a modified styrene acrylic copolymer, followed by a chain extension reaction at 100 to 180° C.

Specifically, the resin composition of step (c) may be subjected to a chain extension reaction in the range of 100 to 180° C. If the resin composition obtained in step (c) is subjected to a chain extension reaction at a temperature higher than the upper limit of the above-described range due to the high melt flow index thereof, the rate of a pyrolysis reaction, which is a reverse reaction, may increase along with an increase in the chain extension reaction rate, resulting in excessive widening of the molecular weight distribution of the resin composition, and the mechanical properties of the resin composition may deteriorate due to oxidation products and short polymer chains produced by the pyrolysis reaction, and the storage stability thereof may be reduced due to rapid hydrolysis. On the other hand, if the chain extension reaction is performed at a temperature lower than the lower limit of the above-described range, the resin composition may not be sufficiently melted in the reaction step, and thus the reaction may not occur sufficiently, so that the effect of the reaction cannot be obtained.

The chain extender that is used in step (d) may be one compound selected from among an isocyanate compound and a carbodiimide compound. In this case, the isocyanate compound used may be one selected from the group consisting of 1,6-hexamethylene diisocyanate, isophorone diisocyanate, 4,4'-diphenylmethane diisocyanate, and 2,2'-diphenylmethane diisocyanate. The carbodiimide compound as another chain extender may be one selected from the group consisting of 1,3-dicyclohexylcarbodiimide, HMV-8CA, HMV-10B commercially available from Nisshinbo, Raschig's STABILIZER 9000, STABILIZER 7000, bis-(2,6-diisopropyl-phenylene-2,4-carbodiimide), and poly-(1,3,5-triisopropyl-phenylene-2,4-carbodiimide).

The biodegradable aliphatic polyester resin composition obtained through step (d) has a number-average molecular weight (Mn) of 20,000 to 40,000, and a melt flow index of 25 g/10 min to 45 g/10 min as measured at 190° C. and a load of 2,160 g.

The biodegradable aliphatic/aromatic copolyester resin composition obtained through step (d) has a number-average molecular weight (Mn) of 20,000 to 40,000, a melt flow index of 25 g/10 min to 45 g/10 min as measured at 190° C. and a load of 2,160 g, and an acid value of 0.8 mg KOH/g to 2.0 mg KOH/g.

Step (e)

Step (e) is a step of producing a biodegradable resin composition having an increased molecular weight by solid-state polymerization of the resin composition, produced in step (d), at a temperature lower than the melting point of the resin composition.

Preferably, step (e) is a step of producing a final biodegradable aliphatic polyester resin composition or a final biodegradable aliphatic/aromatic copolyester resin composition by solid-state polymerization of the biodegradable aliphatic polyester resin composition or the biodegradable aliphatic/aromatic copolyester resin composition, produced in step (d), at a temperature of 55° C. to 100° C. or a temperature of 70° C. to 100° C., respectively, which is lower than the melting point of the resin composition.

In the solid-state polymerization of step (e), a dehumidifying dryer or vacuum dryer to which dehumidified air is supplied may be used as a reactor. More preferably, the reaction is carried out in a vacuum dryer capable of maintaining a vacuum level of less than 1 Torr. This is advantageous in terms of shortening the reaction time. The final biodegradable resin composition obtained through the solid-state polymerization may be suppressed from side reactions due to the reaction at a temperature below the melting temperature, and may have improved storage stability due to improvement in hydrolysis resistance at the end of the resin composition, and may have improved mechanical properties and processing performance due to low contents of residual monomers and low-molecular weight oligomers, an increased degree of crystallinity and an increased molecular weight.

The biodegradable aliphatic polyester resin composition of the present invention, finally produced by performing the solid-state polymerization in step (e), may have a melting point of 65 to 120° C., a number-average molecular weight (Mn) of 35,000 to 80,000, a weight-average molecular weight (Mw) of 100,000 to 350,000, and a melt flow index of 0.5 to 10 g/10 min as measured at 190° C. and a load of 2.16 kg.

Furthermore, the biodegradable aliphatic/aromatic copolyester resin composition of the present invention, finally produced by performing the solid-state polymerization in step (e), may have a melting point of 85 to 160° C., a number-average molecular weight (Mn) of 35,000 to 80,000, a weight-average molecular weight (Mw) of 100,000 to 350,000, a melt flow index of 0.5 to 10 g/10 min as measured at 190° C. and a load of 2.16 kg, and an acid value of 0.8 mg KOH/g to 2.0 mg KOH/g.

In addition, according to the present invention, an additive that is commonly used in the art may be additionally added to step (b) or step (c) as needed during the production of the biodegradable resin composition in order to improve performance, or may be added during mixing which is performed using a twin-screw extruder or a kneader after step (c).

Specifically, the additive may be at least one selected from the group consisting of an antioxidant, a UV stabilizer and a lubricant.

The antioxidant is preferably a phenol-based antioxidant, and specifically, Adekastab AO series, Irgafos series, or a mixture thereof may be used as the antioxidant. The antioxidant may be mixed in an amount of 0.1 to 1.0 parts by weight based on 100 parts by weight of the aliphatic polyester resin composition.

The ultraviolet stabilizer may be a HALS-based compound having an amine group, and the ultraviolet stabilizer may be mixed in an amount of 0.1 to 0.8 parts by weight based on 100 parts by weight of the aliphatic polyester resin composition.

The lubricant may be an amide-based PE wax, and the lubricant may be mixed in an amount of 0.1 to 1.0 parts by weight based on 100 parts by weight of the aliphatic polyester resin composition.

The biodegradable aliphatic polyester resin composition of the present invention may have a melting point of 65 to 120° C., a number-average molecular weight (Mn) of 35,000 to 80,000, a weight-average molecular weight (Mw) of 100,000 to 350,000, and a melt flow index of 0.5 to 10 g/10 min as measured at 190° C. and a load of 2.16 kg. Preferably, the biodegradable resin composition has a melting point of 85 to 118° C., a number-average molecular weight (Mn) of 38,000 to 60,000, a weight-average molecular weight (Mw) of 110,000 to 250,000, and a melt flow index of 1 to 8 g/10 min as measured at 190° C. and a load of 2.16 kg. More preferably, the biodegradable resin composition has a melting point of 95 to 115° C., a number-average molecular weight (Mn) of 40,000 to 65,000, a weight-average molecular weight (Mw) of 115,000 to 200,000, and a melt flow index of 2 to 6 g/10 min as measured at 190° C. and a load of 2.16 kg.

The biodegradable aliphatic/aromatic copolyester resin composition of the present invention may have a melting point of 85 to 160° C., a number-average molecular weight (Mn) of 35,000 to 80,000, a weight-average molecular weight (Mw) of 100,000 to 350,000, and a melt flow index of 0.5 to 10 g/10 min as measured at 190° C. and a load of 2.16 kg. Preferably, the biodegradable resin composition has a melting point of 95 to 150° C., a number-average molecular weight (Mn) of 38,000 to 60,000, a weight-average molecular weight (Mw) of 110,000 to 250,000, and a melt flow index of 1 to 8 g/10 min as measured at 190° C. and a load of 2.16 kg. More preferably, the biodegradable resin composition has a melting point of 120 to 150° C., a number-average molecular weight (Mn) of 40,000 to 65,000, a weight-average molecular weight (Mw) of 115,000 to 200,000, a melt flow index of 2 to 6 g/10 min as measured at 190° C. and a load of 2.16 kg, and an acid value of 0.8 mg KOH/g to 2.0 mg KOH/g.

Advantageous Effects

The biodegradable resin composition according to the present invention may be obtained by mixing an aliphatic dicarboxylic acid and an aliphatic diol or an acid component comprising an aliphatic dicarboxylic acid and an aromatic dicarboxylic acid and an aliphatic diol, and subjecting the mixture sequentially to esterification, transesterification, polycondensation, chain extension and solid-state polymerization reactions. Thus, by reducing the polycondensation reaction rate, it is possible to produce a biodegradable resin having excellent productivity and economic efficiency and having a high molecular weight.

In particular, the biodegradable resin composition may be obtained by essentially performing a chain extension reaction and a solid-state polymerization reaction on a reaction product having a low acid value due to a decrease in the amount of pyrolysis products generated by shortening of the polycondensation reaction time in a high temperature state. Thus, it is possible to prepare a biodegradable resin composition having a higher molecular weight than the conventional aliphatic polyester resin or the conventional aliphatic/aromatic resin and having improved mechanical properties, moldability and durability.

In addition, the biodegradable resin composition according to the present invention has excellent tensile strength, elongation and processability compared to conventional aliphatic polyester resins by mixing an appropriate amount of a polyfunctional compound having a long chain group with an aliphatic dicarboxylic acid and an aliphatic diol or an acid component comprising an dicarboxylic aliphatic acid and an aliphatic/aromatic dicarboxylic acid and an aliphatic diol. Furthermore, the biodegradable resin composition according to the present invention is biodegradable in the natural state during landfill, so it has the advantage of being environmentally friendly.

The effects of the present invention are not limited to the above-mentioned effects. It should be understood that the effects of the present invention include all effects that can be inferred from the following description.

BEST MODE

The above objects, other objects, features and advantages of the present invention will be readily understood through the following preferred embodiments in conjunction with the accompanying drawings. However, the present invention is not limited to the embodiments described herein and may be embodied in other forms. Rather, the embodiments disclosed herein are provided so that this disclosure will be thorough and complete, and will fully convey the spirit of the present invention to those skilled in the art.

Hereinafter, the present invention will be described in more detail with reference to examples, but the present invention is not limited by the following examples.

Production Example: Production of Polyfunctional Compound

After substituting a 1,000 ml round-bottom flask with nitrogen, 268.16 g of DL-malic acid, 148.96 g of ethylene glycol and 0.02 g of monobutyltin oxide as a catalyst were introduced into the reactor and then subjected to an esterification reaction at 120° C. for 2 hours. When the theoretical amount of water generated as a byproduct of the reaction reached 2 moles, the reaction was determined to be complete, and the reaction was terminated, thus producing a polyfunctional compound. The process for producing this polyfunctional compound is shown in the following Reaction Scheme 1:

[Reaction Scheme 1]

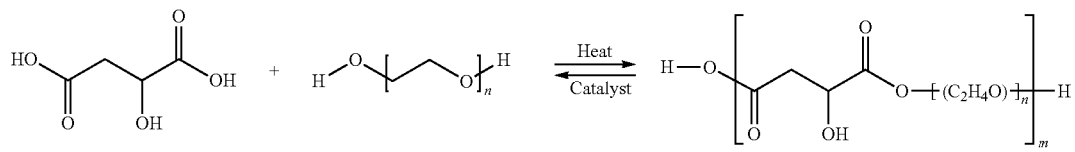

wherein m is an integer ranging from 2 to 30.

Example 1: Production of Biodegradable Aliphatic Polyester Resin Composition (1)

A 100-L reactor was substituted with nitrogen, and 29.23 kg of adipic acid, 22.53 kg of 1,4-butanediol and 300 g of the polyfunctional compound obtained in the Production Example were introduced into the reactor. The reaction temperature was increased and finally set to 205° C., and then a theoretical amount of water was discharged. At this time, 10 g of dibutyltin oxide and 10 g of titanium isopropoxide were added as a catalyst, and 20 g of trimethyl phosphate was added as a stabilizer. Thereafter, the temperature of the reactor was increased, and a polycondensation reaction was performed at a temperature of 245° C. under a reduced pressure of 1.5 Torr for 210 minutes to obtain an aliphatic polyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 160° C. Thereafter, the reaction product obtained through the chain extension reaction introduced a was into solid-state polymerization apparatus equipped with a vacuum pump and subjected to a solid-state polymerization reaction at 55° C. for 8 hours to obtain a final biodegradable resin composition.

Example 2: Production of Biodegradable Aliphatic Polyester Resin Composition (2)

A 100-L reactor was substituted with nitrogen, and 23.62 kg of succinic acid, 22.53 kg of 1,4-butanediol and 300 g of the polyfunctional compound obtained in the Production Example were introduced into the reactor. The reaction temperature was increased and finally set to 205° C., and then a theoretical amount of water was discharged. At this time, 4 g of tetrabutyl titanate, 8 g of dibutyltin oxide and 8 g of titanium isopropoxide were added as a catalyst, and 15 g of trimethyl phosphate was added as a stabilizer. Thereafter, the temperature of the reactor was increased, and a polycondensation reaction was performed at a temperature of 245° C. under a reduced pressure of 1.5 Torr for 181 minutes to obtain an aliphatic polyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 85° C. for 12 hours to obtain a final biodegradable resin composition.

Example 3: Production of Biodegradable Aliphatic Polyester Resin Composition (3)

A 100-L reactor was substituted with nitrogen, and 20.07 kg of succinic acid, 4.38 kg of adipic acid, 22.53 kg of 1,4-butanediol and 300 g of the polyfunctional compound obtained in the Production Example were introduced into the reactor. The reaction temperature was increased and finally set to 195° C., and then a theoretical amount of water was discharged. At this time, 6 g of tetrabutyl titanate, 7 g of dibutyltin oxide and 7 g of titanium isopropoxide were added as a catalyst, and 14 g of trimethyl phosphate was added as a stabilizer. Thereafter, the temperature of the reactor was increased, and a polycondensation reaction was performed at a temperature of 240° C. under a reduced pressure of 1.5 Torr for 192 minutes to obtain an aliphatic polyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 170° C. Thereafter, the reaction product obtained through the chain extension reaction was introduced into a solid-state polymerization apparatus equipped with a dehumidifier and subjected to a solid-state polymerization reaction at 80° C. for 12 hours to obtain a final biodegradable resin composition.

Example 4: Production of Biodegradable Aliphatic Polyester Resin Composition (4)

A 100-L reactor was substituted with nitrogen, and 22.91 kg of succinic acid, 0.88 kg of adipic acid, 22.08 kg of 1,4-butanediol, 0.3 kg of ethylene glycol and 350 g of the polyfunctional compound obtained in the Production Example were introduced into the reactor. The reaction temperature was increased and finally set to 235° C., and then a theoretical amount of water was discharged. At this time, 10 g of dibutyltin oxide and 10 g of titanium propoxide were added as a catalyst, and 20 g of trimethyl phosphate was added as a stabilizer. Thereafter, the temperature of the reactor was increased, and a polycondensation reaction was performed at a temperature of 250° C. under a reduced pressure of 1.5 Torr for 189 minutes to obtain an aliphatic polyester resin composition. At this time, 20 g of tetrabutyl titanate were added as a catalyst, and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 160° C. Thereafter, the reaction product obtained through the chain extension reaction was introduced into a solid-state polymerization apparatus equipped with a dehumidifier and subjected to a solid-state polymerization reaction at 85° C. for 10 hours to obtain a final biodegradable resin composition.

Example 5: Production of Biodegradable Aliphatic Polyester Resin Composition (5)

A 100-L reactor was substituted with nitrogen, and 23.62 kg of succinic acid, 21.4 kg of 1,4-butanediol, 0.75 kg of ethylene glycol and 350 g of the polyfunctional compound obtained in the Production Example were introduced into the reactor. The reaction temperature was increased and finally set to 235° C., and then a theoretical amount of water was discharged. At this time, 10 g of dibutyltin oxide and 10 g of titanium propoxide were added as a catalyst, and 20 g of trimethyl phosphate was added as a stabilizer. Thereafter, the temperature of the reactor was increased, and a polycondensation reaction was performed at a temperature of 250° C. under a reduced pressure of 1.5 Torr for 194 minutes to obtain an aliphatic polyester resin composition. At this time, 20 g of tetrabutyl titanate were added as a catalyst, and 20 g of trimethyl phosphate was added as a stabilizer. Then, 100 kg of the resin composition obtained through the polycondensation reaction and 500 of 1,6-hexamethylene diisocyanate were mixed together using a supermixer, and then subjected to a chain extension reaction using a twin screw extruder having a diameter of 58 mm at 130° C. Thereafter, the reaction product obtained through the chain extension reaction was introduced into a solid-state polymerization apparatus equipped with a vacuum pump and subjected to a solid-state polymerization reaction at 85° C. for 10 hours to obtain a final biodegradable resin composition.

Comparative Example 1

A 100-L reactor was substituted with nitrogen, and 29.23 kg of adipic acid and 23.53 kg of 1,4-butanediol were introduced into the reactor. The reaction temperature was increased and finally set to 205° C., and then a theoretical amount of water was discharged. At this time, 10 g of dibutyltin oxide and 10 g of titanium isopropoxide were added as a catalyst, and 20 g of trimethyl phosphate was added as a stabilizer. Thereafter, the temperature of the reactor was increased, and a polycondensation reaction was performed at a temperature of 245° C. under a reduced pressure of 1.5 Torr for 320 minutes to obtain an aliphatic polyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 55° C. for 8 hours to obtain a final biodegradable resin composition.

Comparative Example 2

A 100-L reactor was substituted with nitrogen, and 23.62 kg of succinic acid and 22.53 kg of 1,4-butanediol were introduced into the reactor. The reaction temperature was increased and finally set to 203° C., and then a theoretical amount of water was discharged. At this time, 4 g of tetrabutyl titanate, 8 g of dibutyltin oxide and 8 g of titanium isopropoxide were added as a catalyst, and 15 g of trimethyl phosphate was added as a stabilizer. Thereafter, the temperature of the reactor was increased, and a polycondensation reaction was performed at a temperature of 245° C. under a reduced pressure of 1.5 Torr for 286 minutes to obtain an aliphatic polyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 85° C. for 12 hours to obtain a final biodegradable resin composition.

Comparative Example 3

A 100-L reactor was substituted with nitrogen, and 20.07 kg of succinic acid, 4.38 kg of adipic acid and 22.53 kg of 1,4-butanediol were introduced into the reactor. The reaction temperature was increased and finally set to 205° C., and then a theoretical amount of water was discharged. At this time, 6 g of tetrabutyl titanate, 7 g of dibutyltin oxide and 7 g of titanium isopropoxide were added as a catalyst, and 14 g of trimethyl phosphate was added as a stabilizer. Thereafter, the temperature of the reactor was increased, and a polycondensation reaction was performed at a temperature of 240° C. under a reduced pressure of 1.5 Torr for 348 minutes to obtain an aliphatic polyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 80° C. for 13 hours to obtain a final biodegradable resin composition.

Comparative Example 4

A 100-L reactor was substituted with nitrogen, and 22.91 kg of succinic acid, 0.88 kg of adipic acid, 22.08 kg of 1,4-butanediol and 0.3 kg of ethylene glycol were introduced into the reactor. The reaction temperature was increased and finally set to 235° C., and then a theoretical amount of water was discharged. At this time, 10 g of dibutyltin oxide and 10 g of titanium propoxide were added as a catalyst, and 20 g of trimethyl phosphate was added as a stabilizer. Thereafter, the temperature of the reactor was increased, and a polycondensation reaction was performed at a temperature of 250° C. under a reduced pressure of 1.5 Torr for 287 minutes to obtain an aliphatic polyester resin composition. At this time, 10 g of tetrabutyl titanate was added as a catalyst, and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 85° C. for 14 hours to obtain a final biodegradable resin composition.

Comparative Example 5

A 100-L reactor was substituted with nitrogen, and 23.62 kg of succinic acid, 21.4 kg of 1,4-butanediol and 0.75 kg of ethylene glycol were introduced into the reactor. The reaction temperature was increased and finally set to 235° C., and then a theoretical amount of water was discharged. At this time, 10 g of dibutyltin oxide and 10 g of titanium propoxide were added as a catalyst, and 20 g of trimethyl phosphate was added as a stabilizer. Thereafter, the temperature of the reactor was increased, and a polycondensation reaction was performed at a temperature of 250° C. under a reduced pressure of 1.5 Torr for 324 minutes to obtain an aliphatic polyester resin composition. At this time, 20 g of tetrabutyl titanate was added as a catalyst, and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 85° C. for 11 hours to obtain a final biodegradable resin composition.

Experimental Example 1: Measurement of Molecular Weight, Melting Point and Melt Flow Index The number-average molecular weight, weight-average molecular weight, melting point and melt flow index of each of the resin compositions produced by the methods of Examples 1 to 5 and Comparative Examples 1 to 5, were evaluated by the methods described below. The results of the evaluation are shown in Table 1 below.

[Evaluation Methods]

(1) Number-Average Molecular Weight and Weight-Average Molecular Weight

The number-average molecular weight and weight-average molecular weight distributions were measured by column chromatography using a system equipped with polystyrene at a temperature of 35° C. At this time, the developing solvent used was chloroform, the concentration of the sample used was 5 mg/mL, and the flow rate of the solvent was 1.0 mL/min.

(2) Melting Point

The melting point was measured using a differential scanning calorimeter at a temperature ranging from 20° C. to 200° C. at a temperature increase rate of 10° C. per minute under a nitrogen atmosphere.

(3) Melt Flow Index

The melt flow index was measured according to the ASTM D1238 standard under the conditions of 190° C. and 2, 160 g.

Experimental Example 2: Evaluation of Mechanical Properties

The mechanical properties of the biodegradable resin composition produced in Examples 1 to 5 and Comparative Examples 1 to 5 were evaluated by the methods described below. The results of the evaluation are shown in Table 2 below.

[Evaluation Method]

The evaluation of mechanical properties was carried out by manufacturing a film having a thickness of 25 μm with an expansion ratio of 2.0 to 1 using a blown film machine having a screw diameter of 50 mm, a die gap of 2.2 mm, and a die diameter of 100 mm.

(1) Tensile Strength and Elongation

Tensile strength and elongation were measured using a universal test machine by preparing a specimen conforming to the ASTM D638 standard.

(2) Decomposition Evaluation

The sample prepared by the above method was recovered 12 months after burying at a depth of 30 cm from the soil surface and measured using the weight reduction method.

(3) Processability

Processability was visually observed for bubble stability and wrinkling during film production. At this time, as the Processability evaluation criteria, if the state of the film was good, it was indicated by ○, if it was normal, it was indicated by Δ, and if it was bad, it was indicated by X.

TABLE 1

| | Number-average molecular weight | weight-average molecular weight | Melting point (° C.) | Melt flow index (g/10 min) | Polycondensation reaction time (min) |
|---|---|---|---|---|---|
| Example 1 | 51,250 | 143,500 | 65.4 | 5.2 | 210 |
| Example 2 | 63,700 | 183,450 | 118.1 | 2.4 | 181 |
| Example 3 | 66,280 | 206,790 | 97.1 | 2.6 | 192 |
| Example 4 | 62,840 | 209,250 | 110.5 | 2.9 | 189 |
| Example 5 | 63,700 | 209,573 | 111.0 | 3.2 | 194 |
| Comparative Example 1 | 22,300 | 55,750 | 64.8 | 62 | 320 |
| Comparative Example 2 | 26,300 | 80,430 | 117.8 | 36 | 286 |
| Comparative Example 3 | 24,250 | 78,660 | 95.2 | 41 | 348 |
| Comparative Example 4 | 27,500 | 81,210 | 110.0 | 39 | 287 |
| Comparative Example 5 | 23,200 | 66,320 | 10.9.6 | 42 | 324 |

From the results in Table 1 above, it could be seen that Examples 1 to 5 had a higher number-average molecular weight and weigt-average molecular weight even for a short reaction time than Comparative Examples 1 to 5. In addition, it was found that Examples 1 to 5 had a lower melt flow index than Comparative Examples 1 to 5 and were advantageous in extrusion moldability and mechanical properties.

On the contrary, in the case of Comparative Examples 1 to 5, which do not contain the polyfunctional compound, the polycondensation reaction took a long time, the number-average molecular weight and the weight-average molecular weight were significantly lower than those of Examples 1 to 5 as a whole, and the melt flow index was very high, suggesting that the resin compositions of Comparative Examples 1 to 5 had poor extrusion formability, mechanical properties and durability.

TABLE 2

| | Tensile strength (kgf/cm$^2$) | Elongation (%) | Biodegradability (%) | Processability |
|---|---|---|---|---|
| Example 1 | 285 | 200 | 88.1 | Δ |
| Example 2 | 380 | 150 | 81.2 | ○ |
| Example 3 | 350 | 300 | 83.5 | ○ |
| Example 4 | 350 | 300 | 85.6 | ○ |
| Example 5 | 375 | 275 | 80.6 | ○ |
| Comparative Example 1 | 105 | 150 | 89.0 | X |
| Comparative Example 2 | 125 | 100 | 79.8 | X |
| Comparative Example 3 | 135 | 125 | 84..2 | Δ |
| Comparative Example 4 | 110 | 150 | 85.1 | Δ |
| Comparative Example 5 | 125 | 100 | 81.3 | X |

* Processability evaluation criteria.: ○ Good, Δ Normal, X Bad

From the results in Table 2 above, it was confirmed that Example 1 to 5 had significantly increased mechanical properties of tensile strength, elongation, and processability compared to Comparative Examples 1 to 5. In addition, Examples 1 to 5 showed excellent biodegradability even in the result of biodegradability experiment.

On the other hand, Comparative Examples 1 to 5 showed excellent biodegradability of 79.88 or more, but this was only due to the low molecular weight, and on the contrary, as predicted from the melt flow index and molecular weight analysis results, tensile strength and elongation rate was significantly reduced, and processability was not good at an average or bad level.

Experimental Example 3: Evaluation of Weatherproof

After leaving the resin compositions prepared in Examples 1 to 5 and Comparative Examples 1 to 5 at a temperature of 25° C. and a relative humidity of 75%, samples were taken every 6 months to the change in number average molecular weight. The change in molecular weight was compared with the initial value. In addition, after leaving the film produced by the method of Experimental Example 2 at a temperature of 25° C. and a relative humidity of 75%, samples were collected every 6 months, tensile strength and elongation were measured, and the change over time was confirmed by comparing with the initial values.

TABLE 3

|  | Tensile strength (kgf/cm$^2$) | | | Elongation (%) | | | Number-average molecular weight | | |
| --- | --- | --- | --- | --- | --- | --- | --- | --- | --- |
|  | Initial | After 6 months | After 12 months | Initial | After 6 months | After 12 months | Initial | After 6 months | After 12 months |
| Example 1 | 285 | 262 | 237 | 200 | 184 | 166 | 51,250 | 49,713 | 43,563 |
| Example 2 | 380 | 353 | 334 | 150 | 140 | 132 | 63,700 | 62,426 | 59,878 |
| Example 3 | 350 | 319 | 287 | 300 | 273 | 246 | 66,280 | 64,954 | 60,315 |
| Example 4 | 350 | 322 | 294 | 300 | 276 | 252 | 62,840 | 59,698 | 58,441 |
| Example 5 | 375 | 364 | 323 | 275 | 267 | 237 | 63,700 | 63,636 | 58,604 |
| Comparative Example 1 | 105 | 85 | 53 | 150 | 122 | 75 | 22,300 | 18,509 | 13,826 |
| Comparative Example 2 | 125 | 100 | 66 | 100 | 80 | 53 | 26,300 | 21,303 | 17,884 |
| Comparative Example 3 | 135 | 105 | 70 | 125 | 98 | 65 | 24,250 | 19,643 | 15,278 |
| Comparative Example 4 | 110 | 85 | 53 | 150 | 116 | 72 | 27,500 | 22,825 | 16,775 |
| Comparative Example 5 | 125 | 99 | 60 | 100 | 79 | 48 | 23,200 | 18,838 | 13,456 |

From the results in Table 3 above, in the case of Examples 1 to 5, compared to Comparative Examples 1 to 5, the width of the change over time of the physical properties and the decrease in the number average molecular weight were significantly smaller, and it was confirmed that the biodegradable resin composition according to the present invention had excellent weatherproof.

Example 6: Production of Biodegradable Aliphatic/Aromatic Copolyester Resin Composition (1)

A 100-L reactor was substituted with nitrogen, and 18.64 kg of dimethyl terephthalate, 10.81 kg of 1,4-butanediol, 300 g of the polyfunctional compound obtained in the Production Example, and 9.6 kg of tetrabutyl titanate as a catalyst were introduced into the reactor. The reaction temperature was increased while stirring and finally set to 195° C., and then methanol was discharged. Then, 15.2 kg of adipic acid and 11.72 kg of 1,4-butanediol were introduced into the reactor. The reaction temperature was increased and finally set to 205° C., and then a theoretical amount of water was discharged. At this time, 10 g of dibutyltin oxide and 10 g of titanium isopropoxide were added as a catalyst, and 20 g of trimethyl phosphate was added as a stabilizer. Thereafter, the temperature of the reactor was increased, and a polycondensation reaction was performed at a temperature of 245° C. under a reduced pressure of 1.5 Torr for 180 minutes to obtain an aliphatic/aromatic copolyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 160° C. Thereafter, the reaction product obtained through the chain extension reaction was introduced into a solid-state polymerization apparatus equipped with a vacuum pump and subjected to a solid-state polymerization reaction at 80° C. for 8 hours to obtain a final biodegradable resin composition.

Example 7: Production of Biodegradable Aliphatic/Aromatic Copolyester Resin Composition (2)

A 100-L reactor was substituted with nitrogen, and 21.36 kg of dimethyl terephthalate, 22.53 kg of 1,4-butanediol, 310 g of the polyfunctional compound obtained in the Production Example, and 10.4 kg of tetrabutyl titanate as a catalyst were introduced into the reactor. The reaction temperature was increased while stirring and finally set to 200° C., and then methanol was discharged. Then, 13.15 kg of adipic acid was introduced into the reactor. The reaction temperature was increased and finally set to 203° C., and then a theoretical amount of water was discharged. At this time, 8 g of dibutyltin oxide and 8 g of titanium isopropoxide were added as a catalyst, and 15 g of trimethyl phosphate was added as a stabilizer. Thereafter, the temperature of the reactor was increased, and a polycondensation reaction was performed at a temperature of 245° C. under a reduced pressure of 1.5 Torr for 188 minutes to obtain an aliphatic/aromatic copolyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 85° C. for 12 hours to obtain a final biodegradable resin composition.

Example 8: Production of Biodegradable Aliphatic/Aromatic Copolyester Resin Composition (3)

A 100-L reactor was substituted with nitrogen, and 17.48 kg of dimethyl terephthalate, 22.53 kg of 1,4-butanediol, 300 g of the polyfunctional compound obtained in the Production Example, and 10.4 kg of tetrabutyl titanate as a catalyst were introduced into the reactor. The reaction temperature was increased while stirring and finally set to 195°

C., methanol was discharged. Then, 16.08 kg of succinic acid was added to the reactor, the reaction temperature was increased and finally set to 205° C., and then a theoretical amount of water was discharged. At this time, 7 g of dibutyltin oxide and 7 g of titanium isopropoxide were added as a catalyst, and 14 g of trimethyl phosphate was added as a stabilizer. Thereafter, the temperature of the reactor was increased, and a polycondensation reaction was performed at a temperature of 240° C. under a reduced pressure of 1.5 Torr for 164 minutes to obtain an aliphatic/aromatic copolyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 170° C. Thereafter, the reaction product obtained through the chain extension reaction was introduced into a solid-state polymerization apparatus equipped with a vacuum pump and subjected to a solid-state polymerization reaction at 85° C. for 12 hours to obtain a final biodegradable resin composition.

Example 9: Production of Biodegradable Aliphatic/Aromatic Copolyester Resin Composition (4)

A 100-L reactor was substituted with nitrogen, and 14.95 kg of isophthalic acid, 13.0 kg of succinic acid, 23.43 kg of 1,4-butanediol, and 350 g of the polyfunctional compound obtained in the Production Example were introduced into the reactor. The reaction temperature was increased while stirring and finally set to 235° C., and then a theoretical amount of water was discharged. At this time, 10 g of dibutyltin oxide and 10 g of titanium propoxide were added as a catalyst, and 20 g of trimethyl phosphate was added as a stabilizer. Thereafter, the temperature of the reactor was increased, and a polycondensation reaction was performed at a temperature of 250° C. under a reduced pressure of 1.5 Torr for 162) obtain an aliphatic/aromatic copolyester resin composition. At this time, 20 g of tetrabutyl titanate was added as a catalyst and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 160° C. Thereafter, the reaction product obtained through the chain extension reaction was introduced into a solid-state polymerization apparatus equipped with a dehumidifier and subjected to a solid-state polymerization reaction at 80° C. for 10 hours to obtain a final biodegradable resin composition.

Example 10: Production of Biodegradable Aliphatic/Aromatic Copolyester Resin Composition (5)

A 100-L reactor was substituted with nitrogen, and 15.95 kg of isophthalic acid, 12.28 kg of succinic acid, 23.43 kg of 1,4-butanediol, and 350 g of the polyfunctional compound obtained in the Production Example were introduced into the reactor. The reaction temperature was increased while stirring and finally set to 235° C., and then a theoretical amount of water was discharged. At this time, 10 g of dibutyltin oxide and 10 g of titanium propoxide were added as a catalyst, and 20 g of trimethyl phosphate was added as a stabilizer. Thereafter, the temperature of the reactor was increased, and a polycondensation reaction was performed at a temperature of 250° C. under a reduced pressure of to obtain an aliphatic/aromatic 1.5 Torr for 192 minutes copolyester resin composition. At this time, 20 g of tetrabutyl titanate was added as a catalyst and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 130° C. Thereafter, the reaction product obtained through the chain extension reaction was introduced into a solid-state polymerization apparatus equipped with a vacuum pump and subjected to a solid-state polymerization reaction at 85° C. for 10 hours to obtain a final biodegradable resin composition.

Example 11: Production of Biodegradable Aliphatic/Aromatic Copolyester Resin Composition (6)

A 100-L reactor was substituted with nitrogen, and 15.95 kg of phthalic acid, 15.2 kg of adipic acid, 23.43 kg of 1,4-butanediol, and 400 g of the polyfunctional compound obtained in the Production Example were introduced into the reactor. The reaction temperature was increased while stirring and finally set to 238° C., and then a theoretical amount of water was discharged. At this time, 10 g of dibutyltin oxide and 10 g of tetrabutyl titanate were added as a catalyst, and 15 g of trimethyl phosphate was added as a stabilizer. Thereafter, the temperature of the reactor was increased, and a polycondensation reaction was performed at a temperature of 250° C. under a reduced pressure of 1.5 Torr for 162 minutes to obtain an aliphatic/aromatic copolyester resin composition. At this time, 20 g of tetrabutyl titanate was added as a catalyst and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 130° C. Thereafter, the reaction product obtained through the chain extension reaction was introduced into a solid-state polymerization apparatus equipped with a vacuum pump and subjected to a solid-state polymerization reaction at 85° C. for 10 hours to obtain a final biodegradable resin composition.

Comparative Example 6

A 100-L reactor was substituted with nitrogen, and 18.64 kg of dimethyl terephthalate, 10.81 kg of 1,4-butanediol and 9.6 kg of tetrabutyl titanate as a catalyst were introduced into the reactor. The reaction temperature was increased while stirring and finally set to 195° C., and then methanol was discharged. Then, 15.2 kg of adipic acid and 11.72 kg of 1,4-butanediol were introduced into the reactor, the reaction temperature was increased and finally set to 205° C., and then a theoretical amount of water was discharged. At this time, 10 g of dibutyltin oxide and 10 g of titanium isopropoxide were added as a catalyst, and 20 g of trimethyl phosphate was added as a stabilizer. Thereafter, the temperature of the reactor was increased, and a polycondensation reaction was performed at a temperature of 245° C. under a reduced pressure of for 1.5 Torr 252 minutes to obtain an aliphatic/aromatic copolyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 80° C. for 8 hours to obtain a final biodegradable resin composition.

Comparative Example 7

A 100-L reactor was substituted with nitrogen, and 21.36 kg of dimethyl terephthalate, 22.53 kg of 1,4-butanediol and 10.4 kg of tetrabutyl titanate as a catalyst were introduced into the reactor. The reaction temperature was increased while stirring and finally set to 200° C., and then methanol was discharged. Then, 13.15 kg of adipic acid was introduced into the reactor, the reaction temperature was increased and finally set to 203° C., and then a theoretical amount of water was discharged. At this time, 8 g of dibutyltin oxide and 8 g of titanium isopropoxide were added as a catalyst, and 15 g of trimethyl phosphate was added as a stabilizer. Thereafter, the temperature of the reactor was increased, and a polycondensation reaction was performed at a temperature of 245° C. under a reduced pressure of 1.5 Torr for 268 minutes to obtain an aliphatic/aromatic copolyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 80° C. for 8 hours to obtain a final biodegradable resin composition.

Comparative Example 8

A 100-L reactor was substituted with nitrogen, and 17.48 kg of dimethyl terephthalate, 22.53 kg of 1,4-butanediol and 10.4 kg of tetrabutyl titanate as a catalyst were introduced into the reactor. The reaction temperature was increased and finally set to 195° C., and then methanol was discharged. Then, 16.08 kg of succinic acid was introduced into the reactor, the reaction temperature was increased and finally set to 205° C., and then a theoretical amount of water was discharged. At this time, 7 g of dibutyltin oxide and 7 g of titanium isopropoxide were added as a catalyst, and 14 g of trimethyl phosphate was added as a stabilizer. Thereafter, the temperature of the reactor was increased, and a polycondensation reaction was performed at a temperature of 240° C. under a reduced pressure of 1.5 Torr for 366 minutes to obtain an aliphatic/aromatic copolyester resin composition. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 80° C. for 8 hours to obtain a final biodegradable resin composition.

Comparative Example 9

A 100-L reactor was substituted with nitrogen, and 14.95 kg of phthalic acid, 13.0 kg of succinic acid, 23.43 kg of 1,4-butanediol were introduced into the reactor. The reaction temperature was increased while stirring and finally set to 235° C., and then a theoretical amount of water was discharged. At this time, 10 g of dibutyltin oxide and 10 g of titanium propoxide were added as a catalyst, and 20 g of trimethyl phosphate was added as a stabilizer. Thereafter, the temperature of the reactor was increased, and a polycondensation reaction was performed at a temperature of 250° C. under a reduced pressure of 1.5 Torr for 292 minutes to obtain an aliphatic/aromatic copolyester resin composition. At this time, 20 g of tetrabutyl titanate was added as a catalyst, and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 80° C. for 8 hours to obtain a final biodegradable resin composition.

Comparative Example 10

A 100-L reactor was substituted with nitrogen, and 15.95 kg of phthalic acid, 12.28 kg of succinic acid, 23.43 kg of 1,4-butanediol were introduced into the reactor. The reaction temperature was increased while stirring and finally set to 235° C., and then a theoretical amount of water was discharged. At this time, 10 g of dibutyltin oxide and 10 g of titanium propoxide were added as a catalyst, and 20 g of trimethyl phosphate was added as a stabilizer. Thereafter, the temperature of the reactor was increased, and a polycondensation reaction was performed at a temperature of 250° C. under a reduced pressure of 1.5 Torr for 325 minutes to obtain an aliphatic/aromatic copolyester resin composition. At this time, 20 g of tetrabutyl titanate was added as a catalyst, and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 80° C. for 8 hours to obtain a final biodegradable resin composition.

Comparative Example 11

A 100-L reactor was substituted with nitrogen, and 15.95 kg of phthalic acid, 15.2 kg of adipic acid, 23.43 kg of 1,4-butanediol were introduced into the reactor. The reaction temperature was increased while stirring and finally set to 238° C., and then a theoretical amount of water was discharged. At this time, 10 g of dibutyltin oxide and 10 g of tetrabutyl titanate were added as a catalyst, and 15 g of trimethyl phosphate was added as a stabilizer. Thereafter, the temperature of the reactor was increased, and a polycondensation reaction was performed at a temperature of 250° C. under a reduced pressure of 1.5 Torr for 328 minutes to obtain an aliphatic/aromatic copolyester resin composition. At this time, 20 g of tetrabutyl titanate was added as a catalyst, and 20 g of trimethyl phosphate was added as a stabilizer. Then, 100 kg of the resin composition obtained through the polycondensation reaction and 500 g of 1,6-hexamethylene diisocyanate were mixed together using a supermixer, and then subjected to a chain extension reaction using a twin screw extruder having a diameter of 58 mm at 125° C. Thereafter, the reaction product obtained through the chain extension reaction was introduced into a solid-state polymerization apparatus equipped with a vacuum pump and subjected to a solid-state polymerization reaction at 80° C. for 8 hours to obtain a final biodegradable resin composition.

Experimental Example 4: Measurement of Molecular Weight, Melting Point and Melt Flow Index The number-average molecular weight, weight-average molecular weight, melting point and melt flow index of each of the resin compositions produced by the methods of Examples 6 to 11 and Comparative Examples 6 to 11, were evaluated in the same manner as in Experimental Example 1 above. The results of the evaluation are shown in Table 4 below.

TABLE 4

|  | Number-average molecular weight | weight-average molecular weight | Melting point (° C.) | Melt flow index (g/10 min) | Polycondensation reaction time (min) | Acid value (mgKOH/g) |
|---|---|---|---|---|---|---|
| Example 6 | 53,020 | 158,000 | 125.4 | 3.3 | 180 | 0.97 |
| Example 7 | 59,000 | 184,080 | 148.0 | 2.8 | 188 | 1.25 |
| Example 8 | 54,300 | 165,500 | 121.3 | 3.1 | 164 | 0.85 |
| Example 9 | 48,280 | 159,800 | 120.4 | 4.1 | 162 | 0.80 |
| Example 10 | 62,500 | 180,625 | 125.1 | 2.1 | 192 | 2.0 |
| Example 11 | 55,700 | 169,885 | 124.8 | 3.1 | 182 | 1.38 |
| Comparative Example 6 | 18,345 | 49,531 | 125.0 | 52.1 | 382 | 3.7 |
| Comparative Example 7 | 16,100 | 50,692 | 148.2 | 63.1 | 298 | 3.5 |
| Comparative Example 8 | 20,200 | 48,320 | 120.2 | 48.4 | 366 | 3.8 |
| Comparative Example 9 | 17,250 | 49,680 | 120.9 | 50.6 | 439 | 5.2 |
| Comparative Example 10 | 16,880 | 50,320 | 124.3 | 49.2 | 425 | 4.8 |
| Comparative Example 11 | 17,030 | 38,220 | 123.4 | 47.7 | 408 | 4.3 |

From the results in Table 4 above, it could be seen that Examples 6 to 11 had a higher number-average molecular weight and weight-average molecular weight even for a short reaction time than Comparative Examples 6 to 11. In addition, it was found that Examples 6 to 11 had a lower melt flow index and acid value than Comparative Examples 6 to 11 and were advantageous in extrusion moldability and mechanical properties.

On the contrary, in the case of Comparative Examples 6 to 11, which do not contain the polyfunctional compound, the polycondensation reaction took a long time, the acid value was high due to increased reverse reaction by long reaction time, the number-average molecular weight and the weight-average molecular weight were significantly lower than those of Examples 6 to 11 as a whole, and the melt flow index was very high, suggesting that the resin compositions of Comparative Examples 6 to 11 had poor extrusion formability, mechanical properties and durability.

Experimental Example 5: Evaluation of Mechanical Properties

The mechanical properties of the biodegradable resin composition produced in Examples 6 to 11 and Comparative Examples 6 to 11 were evaluated in the same manner as in Experimental Example 2 above. The results of the evaluation are shown in Table 5 below.

TABLE 5

|  | Tensile strength (kgf/cm$^2$) | Elongation (%) | Biodegradability (%) | Processability |
|---|---|---|---|---|
| Example 6 | 325 | 480 | 78.3 | ○ |
| Example 7 | 352 | 400 | 74.2 | ○ |
| Example 8 | 312 | 500 | 78.5 | ○ |
| Example 9 | 308 | 575 | 81.8 | ○ |
| Example 10 | 318 | 545 | 80.6 | ○ |
| Example 11 | 316 | 538 | 80.9 | Δ |
| Comparative Example 6 | 125 | 250 | 80.0 | X |
| Comparative Example 7 | 132 | 200 | 77.8 | Δ |
| Comparative Example 8 | 128 | 225 | 79.2 | X |
| Comparative Example 9 | 110 | 175 | 80.1 | X |
| Comparative Example 10 | 117 | 125 | 82.3 | X |
| Comparative Example 11 | 98 | 115 | 83.1 | X |

* Processability evaluation criteria.: ○ Good, Δ Normal, X Bad

From the results in Table 5 above, it was confirmed that Example 6 to 11 had significantly increased mechanical properties of tensile strength, elongation, and processability compared to Comparative Examples 6 to 11. In addition, Examples 6 to 11 showed excellent biodegradability even in the result of biodegradability experiment.

On the other hand, Comparative Examples 6 to 11 showed excellent biodegradability of 77% or more, but this was only due to the low molecular weight, and on the contrary, as predicted from the melt flow index and molecular weight analysis results, tensile strength and elongation rate was significantly reduced, and processability was not good at an average or bad level.

Experimental Example 6: Evaluation of Weatherproof

After leaving the resin compositions prepared in Examples 6 to 11 and Comparative Examples 6 to 11 at a temperature of 25° C. and a relative humidity of 75%, samples were taken every 6 months to the change in number average molecular weight. The change in molecular weight was compared with the initial value. In addition, after leaving the film produced by the method of Experimental Example 5 at a temperature of 25° C. and a relative humidity of 75%, samples were collected every 6 months, tensile strength and elongation were measured, and the change over time was confirmed by comparing with the initial values.

TABLE 6

|  | Tensile strength (kgf/cm²) | | | Elongation (%) | | | Number-average molecular weight | | |
| --- | --- | --- | --- | --- | --- | --- | --- | --- | --- |
|  | Initial | After 6 months | After 12 months | Initial | After 6 months | After 12 months | Initial | After 6 months | After 12 months |
| Example 6 | 325 | 319 | 317 | 480 | 473 | 465 | 53,020 | 52,225 | 51,320 |
| Example 7 | 352 | 343 | 342 | 400 | 397 | 375 | 59,000 | 58,520 | 56,995 |
| Example 8 | 312 | 310 | 301 | 500 | 493 | 480 | 54,300 | 53,450 | 52,620 |
| Example 9 | 308 | 304 | 295 | 575 | 564 | 550 | 48,280 | 47,300 | 46,690 |
| Example 10 | 318 | 311 | 306 | 545 | 534 | 525 | 62,500 | 61,100 | 59,000 |
| Example 11 | 316 | 314 | 305 | 538 | 523 | 515 | 55,700 | 54,150 | 53,110 |
| Comparative Example 6 | 125 | 107 | 77.6 | 250 | 210 | 150 | 18,300 | 15,650 | 11,390 |
| Comparative Example 7 | 132 | 110 | 77.5 | 200 | 165 | 110 | 16,100 | 13,395 | 9,451 |
| Comparative Example 8 | 128 | 109 | 80.8 | 225 | 190 | 140 | 20,200 | 17,210 | 12,846 |
| Comparative Example 9 | 110 | 95 | 72.8 | 175 | 150 | 120 | 17,250 | 14,870 | 11,420 |
| Comparative Example 10 | 117 | 101 | 78.5 | 125 | 105 | 85 | 16,800 | 14,635 | 11,500 |
| Comparative Example 11 | 98 | 80 | 58.2 | 115 | 95 | 75 | 17,100 | 13,828 | 10,100 |

From the results in Table 3 above, in the case of Examples 6 to 11, compared to Comparative Examples 6 to 11, the width of the change over time of the physical properties and the decrease in the number average molecular weight were significantly smaller, and it was confirmed that the biodegradable resin composition according to the present invention had excellent weatherproof.

The invention claimed is:

1. A biodegradable resin composition, the biodegradable resin composition being obtained by subjecting an aliphatic dicarboxylic acid or an acid component comprising a mixture of an aliphatic dicarboxylic acid and an aromatic dicarboxylic acid, and an aliphatic diol sequentially to esterification, transesterification, polycondensation, chain extension and solid-state polymerization reactions in the presence of a polyfunctional compound represented by the following Formula 1:

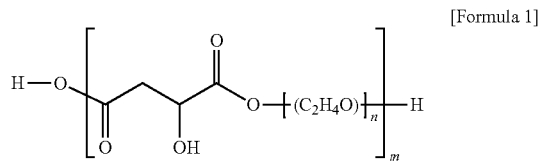

[Formula 1]

wherein n is an integer ranging from 1 to 11, and m is an integer ranging from 2 to 30.

2. The biodegradable resin composition of claim 1, wherein the polyfunctional compound is obtained by mixing DL-malic acid and ethylene glycol or a polyethylene glycol having a weight-average molecular weight (Mw) of 150 to 500 g/mol at a molar ratio of 1:1 to 1:1.5 to obtain a mixture and subjecting the mixture to an esterification reaction.

3. The biodegradable resin composition of claim 1, wherein the polyfunctional compound is mixed in an amount of 0.1 to 3 g per mole of the aliphatic dicarboxylic acid or the acid component.

4. The biodegradable resin composition of claim 1, wherein the aliphatic dicarboxylic acid is at least one selected from the group consisting of oxalic acid, malonic acid, succinic acid, glutaric acid, adipic acid, pimelic acid, suberic acid, azelic acid, sebacic acid, 1,4-cyclohexyldicarboxylic acid, and esterified derivatives thereof.

5. The biodegradable resin composition of claim 1, wherein the aromatic dicarboxylic acid is at least one selected from the group consisting of terephthalic acid, isophthalic acid, 2,6-naphthoic acid, and esterified derivatives thereof.

6. The biodegradable resin composition of claim 1, wherein the aliphatic diol is at least one selected from the group consisting of ethylene glycol, 1,2-propanediol, 1,2-butanediol, 1,3-butanediol, 1,4-butanediol, 1,6-hexanediol, and 1,2-cyclohexanedimethanol.

7. The biodegradable resin composition of claim 1, wherein the mixed component of the aliphatic dicarboxylic acid and the aromatic dicarboxylic acid is a mixture of the aliphatic dicarboxylic acid and the aromatic dicarboxylic acid in a molar ratio of 95:5 to 40:60.

8. The biodegradable resin composition of claim 1, wherein the aliphatic dicarboxylic acid or the acid component, and the aliphatic diol are mixed together at a molar ratio of 1:1.1 to 1.5.

9. The biodegradable resin composition of claim 1, wherein the biodegradable aliphatic polyester resin composition of the biodegradable resin composition has a melting point of 65 to 120° C., a number-average molecular weight (Mn) of 35,000 to 80,000, a weight-average molecular weight (Mw) of 100,000 to 350,000, and a melt flow index of 0.5 to 10 g/10 min as measured at 190° C.

10. The biodegradable resin composition of claim 1, wherein the biodegradable aliphatic/aromatic copolyester resin composition of the biodegradable resin composition has a melting point of 85 to 160° C., a number-average molecular weight (Mn) of 35,000 to 80,000, a weight-average molecular weight (Mw) of 100,000 to 350,000, a melt flow index of 0.5 to 10 g/10 min as measured at 190° C. and a load of 2.16 kg, and an acid value of 0.8 mg KOH/g to 2.0 mg KOH/g.

11. A method for manufacturing a biodegradable resin composition of claim 1, the method comprising steps of:
(a) producing a polyfunctional compound represented by the following Formula 1 by an esterification reaction of DL-malic acid and ethylene glycol or a polyethylene glycol having a weight-average molecular weight (Mw) of 150 to 500 g/mol:

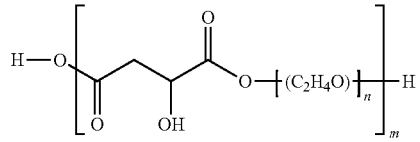

[Formula 1]

wherein n is an integer ranging from 1 to 11, and m is an integer ranging from 2 to 30;
(b) producing a reaction product by esterification and transesterification reactions of an aliphatic dicarboxylic acid or an acid component comprising a mixture of an aliphatic dicarboxylic acid and an aromatic dicarboxylic acid, and an aliphatic diol in the presence of the polyfunctional compound of step (a);
(c) producing an aliphatic polyester resin composition or an aliphatic/aromatic copolyester resin composition by a polycondensation reaction of the reaction product produced in step (b);
(d) introducing the resin composition, produced in step (c), into a twin screw extruder or a kneader, and then introducing one chain extender compound selected from among an isocyanate compound and a carbodiimide compound, followed by a chain extension reaction; and
(e) producing a biodegradable resin composition by solid-state polymerization of the resin composition, produced in step (d), at a temperature lower than a melting point of the resin composition.

12. The method of claim 11, comprising steps of:
(a) producing the polyfunctional compound represented by Formula 1 by an esterification reaction of DL-malic acid and ethylene glycol or a polyethylene glycol having a weight-average molecular weight (Mw) of 150 to 500 g/mol at a molar ratio of 1:1 to 1:1.5 in the presence of a catalyst at 180 to 210° C. for 60 to 180 minutes;
(b) mixing an aliphatic dicarboxylic acid or an acid component comprising a mixture of an aliphatic dicarboxylic acid and an aromatic dicarboxylic acid, and an aliphatic diol at a molar ratio of 1:1.1 to 1:1.5 to obtain a mixture and producing a reaction product by esterification and transesterification reactions of the mixture in the presence of the polyfunctional compound of step (a) at 185 to 235° C.;
(c) producing an aliphatic polyester resin composition or an aliphatic/aromatic copolyester resin composition by a polycondensation reaction of the reaction product, produced in (b), at 235 to 255° C. at a vacuum level of 0.1 to 2 Torr for 100 to 240 minutes;
(d) introducing the aliphatic polyester resin composition or the aliphatic/aromatic copolyester resin composition, produced in step (c), into a twin screw extruder or a kneader, and then introducing 0.05 to 1 part by weight of one chain extender compound selected from among an isocyanate compound and a carbodiimide compound, followed by a chain extension reaction at 100 to 180° C.; and
(e) producing a biodegradable resin composition by solid-state polymerization of the aliphatic polyester resin composition or the aliphatic/aromatic copolyester resin composition, produced in step (d), at a temperature of 55° C. to 100° C. or 70° C. to 100° C., which is lower than the melting point of the resin composition, respectively.

13. The method of claim 11, wherein the catalyst in step (a) is at least one selected from the group consisting of monobutyltin oxide, titanium propoxide, and tetrabutyl titanate.

14. The method of claim 11, wherein step (b) further includes at least one selected from the group consisting of titanium isopropoxide, calcium acetate, antimony trioxide, dibutyltin oxide, antimony acetate, tetrabutyl titanate, and tetrapropyl titanate, at an initial stage or late stage of the esterification and transesterification reactions.

15. The method of claim 11, wherein the mixed component of the aliphatic dicarboxylic acid and the aromatic dicarboxylic acid is a mixture of the aliphatic dicarboxylic acid and the aromatic dicarboxylic acid in a molar ratio of 95:5 to 40:60.

16. The method of claim 11, wherein the biodegradable aliphatic polyester resin composition of the biodegradable resin composition has a melting point of 65 to 120° C., a number-average molecular weight (Mn) of 35,000 to 80,000, a weight-average molecular weight (Mw) of 100,000 to 350,000, and a melt flow index of 0.5 to 10 g/10 min as measured at 190° C.

17. The method of claim 11, wherein the biodegradable aliphatic/aromatic copolyester resin composition of the biodegradable resin composition has a melting point of 85 to 160° C., a number-average molecular weight (Mn) of 35,000 to 80,000, a weight-average molecular weight (Mw) of 100,000 to 350,000, a melt flow index of 0.5 to 10 g/10 min as measured at 190° C. and a load of 2.16 kg, and an acid value of 0.8 mg KOH/g to 2.0 mg KOH/g.

* * * * *